United States Patent
Kitakaze et al.

(10) Patent No.: US 11,253,924 B2
(45) Date of Patent: Feb. 22, 2022

(54) CONTROL DEVICE FOR MACHINE TOOL AND MACHINE TOOL

(71) Applicant: CITIZEN WATCH CO., LTD., Nishitokyo (JP)

(72) Inventors: Ayako Kitakaze, Nishitokyo (JP); Masahiro Muramatsu, Nishitokyo (JP); Kenji Noguchi, Nishitokyo (JP)

(73) Assignee: CITIZEN WATCH CO., LTD., Tokyo (JP)

( * ) Notice: Subject to any disclaimer, the term of this patent is extended or adjusted under 35 U.S.C. 154(b) by 68 days.

(21) Appl. No.: 16/498,333

(22) PCT Filed: Mar. 28, 2018

(86) PCT No.: PCT/JP2018/012685
§ 371 (c)(1),
(2) Date: Sep. 26, 2019

(87) PCT Pub. No.: WO2018/181447
PCT Pub. Date: Oct. 4, 2018

(65) Prior Publication Data
US 2020/0101538 A1 Apr. 2, 2020

(30) Foreign Application Priority Data
Mar. 29, 2017 (JP) .............................. JP2017-065302

(51) Int. Cl.
*B23B 29/12* (2006.01)
*B23B 1/00* (2006.01)
(Continued)

(52) U.S. Cl.
CPC ................ *B23B 1/00* (2013.01); *B23B 25/02* (2013.01); *B23B 29/125* (2013.01); *B23Q 15/013* (2013.01)

(58) Field of Classification Search
CPC ......... B23B 1/00; B23B 25/02; B23B 29/125; B23B 7/00; B23Q 5/50; B23Q 15/0075; B23Q 15/013
See application file for complete search history.

(56) References Cited

U.S. PATENT DOCUMENTS 5,287,607 A 2/1994 Hongo
5,778,745 A * 7/1998 Furusawa ............... B23B 25/02
82/1.11
(Continued)

FOREIGN PATENT DOCUMENTS

EP 3 124 174 A1 2/2017
JP S56-76357 A 6/1981
(Continued)

OTHER PUBLICATIONS

JP 56-76357 USPTO human translation, pp. 1-18. (Year: 2021).*

*Primary Examiner* — Nicole N Ramos
(74) *Attorney, Agent, or Firm* — Birch, Stewart, Kolasch & Birch, LLP

(57) ABSTRACT

A control device for a machine tool and a machine tool, for which settings of the number of vibrations per rotation become easy, is provided. The control device of the machine tool controls a relative rotation between a workpiece and a cutting tool and a relative reciprocal movement between the workpiece and the cutting tool in a feed direction to perform vibration cutting to the workpiece. The control device includes a control section for controlling a spindle headstock, a first tool post, and a second tool post, the workpiece W being installed on the spindle headstock, the first tool post being provided to be reciprocally movable along the feed direction with respect to the spindle headstock and installed with a first cutting tool for cutting the workpiece, and the second tool post being provided to be reciprocally movable along the feed direction with respect to the spindle head- (Continued)

stock independently of the first tool post and installed with a second cutting tool for cutting the workpiece.

11 Claims, 12 Drawing Sheets

(51) Int. Cl.
  *B23Q 15/013* (2006.01)
  *B23B 25/02* (2006.01)

(56) References Cited

U.S. PATENT DOCUMENTS

| | | | | |
|---|---|---|---|---|
| 5,911,802 | A * | 6/1999 | Kimura | B23Q 11/0042 |
| | | | | 82/1.11 |
| 10,268,176 | B2 * | 4/2019 | Sannomiya | G05B 19/19 |
| 10,414,009 | B2 * | 9/2019 | Kitakaze | B23Q 5/22 |
| 2007/0052326 | A1 * | 3/2007 | Liu | B23B 29/125 |
| | | | | 310/323.18 |
| 2008/0238255 | A1 * | 10/2008 | Lee | B23P 25/00 |
| | | | | 310/323.18 |
| 2009/0107308 | A1 * | 4/2009 | Woody | B23B 1/00 |
| | | | | 82/1.11 |
| 2014/0102268 | A1 * | 4/2014 | Hariki | B23B 29/125 |
| | | | | 82/118 |
| 2014/0216216 | A1 * | 8/2014 | Hessenkamper | B23B 29/125 |
| | | | | 82/1.11 |
| 2016/0274560 | A1 | 9/2016 | Nakajima | |
| 2018/0243834 | A1 * | 8/2018 | Sannomiya | G05B 19/4093 |
| 2018/0297164 | A1 * | 10/2018 | Sonoda | B23Q 15/013 |
| 2018/0335765 | A1 * | 11/2018 | Tezuka | G05B 19/404 |

FOREIGN PATENT DOCUMENTS

| | | | | |
|---|---|---|---|---|
| JP | | 3451800 B2 | 9/2003 | |
| JP | | 2016-182654 A | 10/2016 | |
| SU | | 419320 A1 | 3/1974 | |
| WO | WO-2015146945 A1 * | 10/2015 | | B23B 29/125 |
| WO | WO-2016031897 A1 * | 3/2016 | | B23B 1/00 |
| WO | WO-2016152769 A1 * | 9/2016 | | B23Q 5/22 |

\* cited by examiner

FIG.2
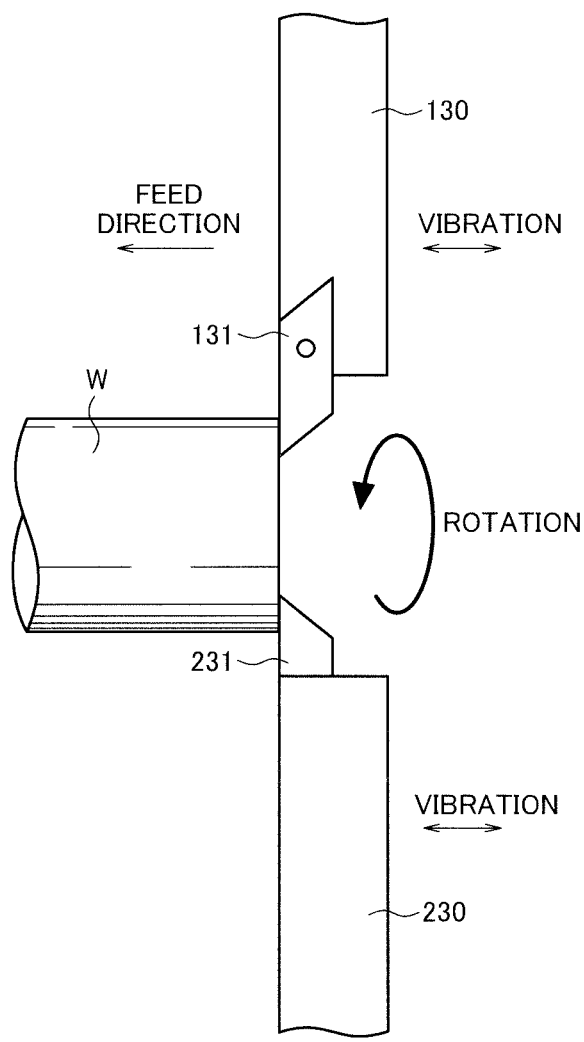
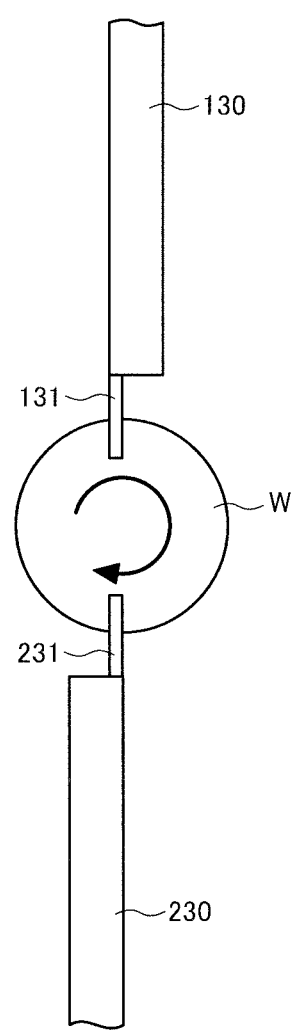
(A) (B)

FIG.6
(A)
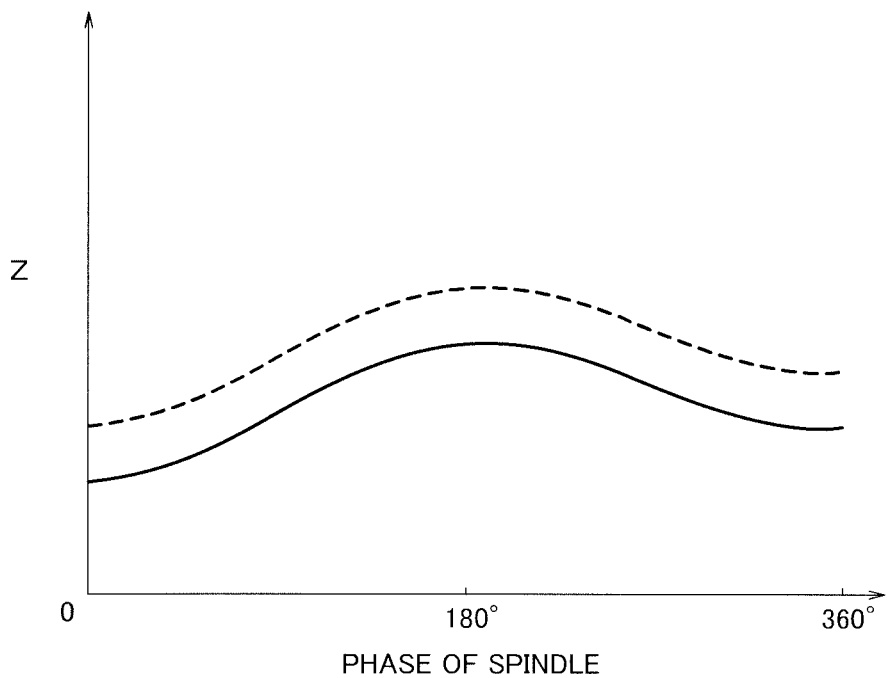
(B)
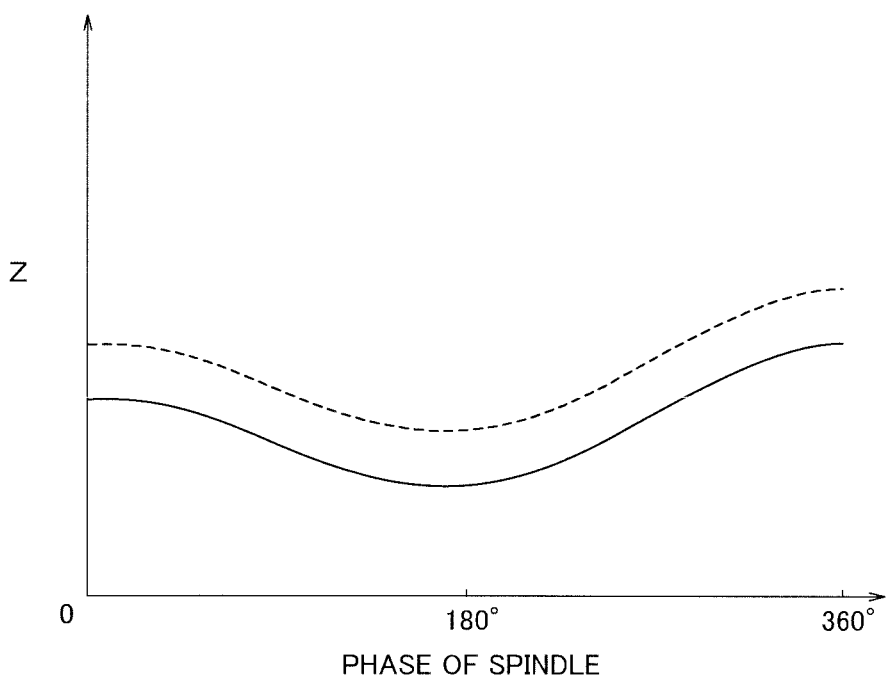

FIG.7
(A)
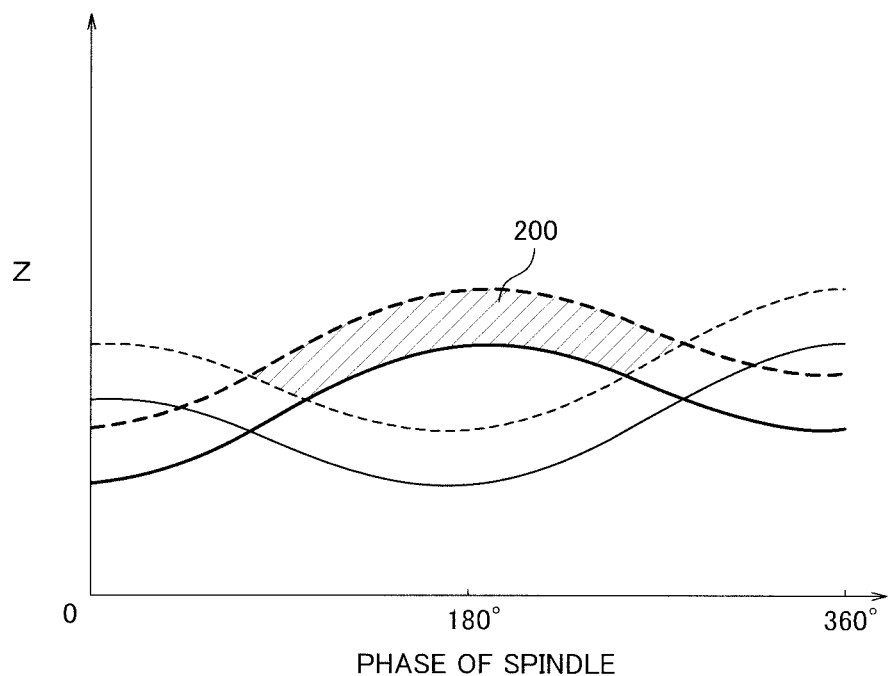
(B)
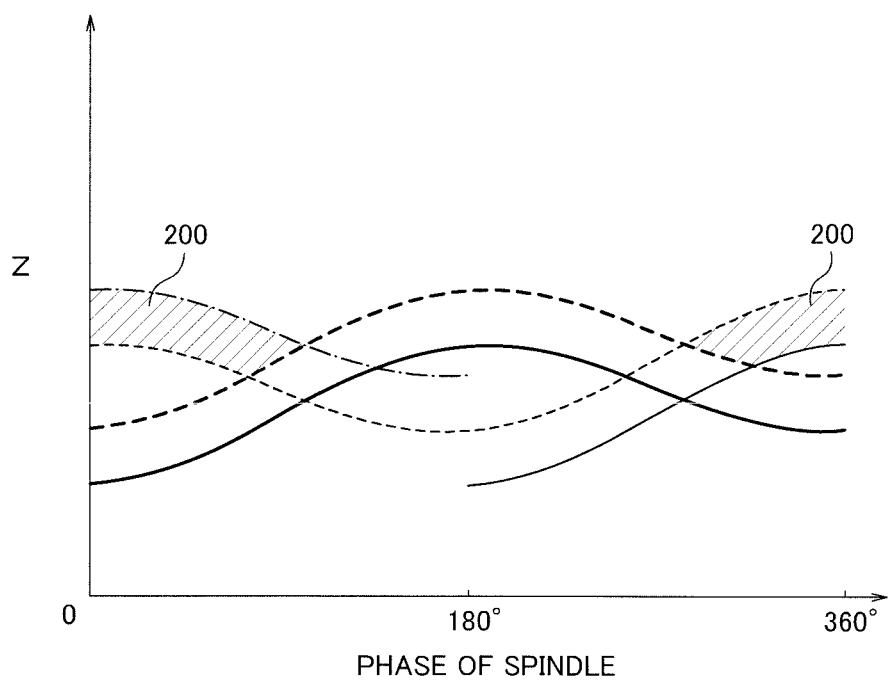

FIG.8
(A)
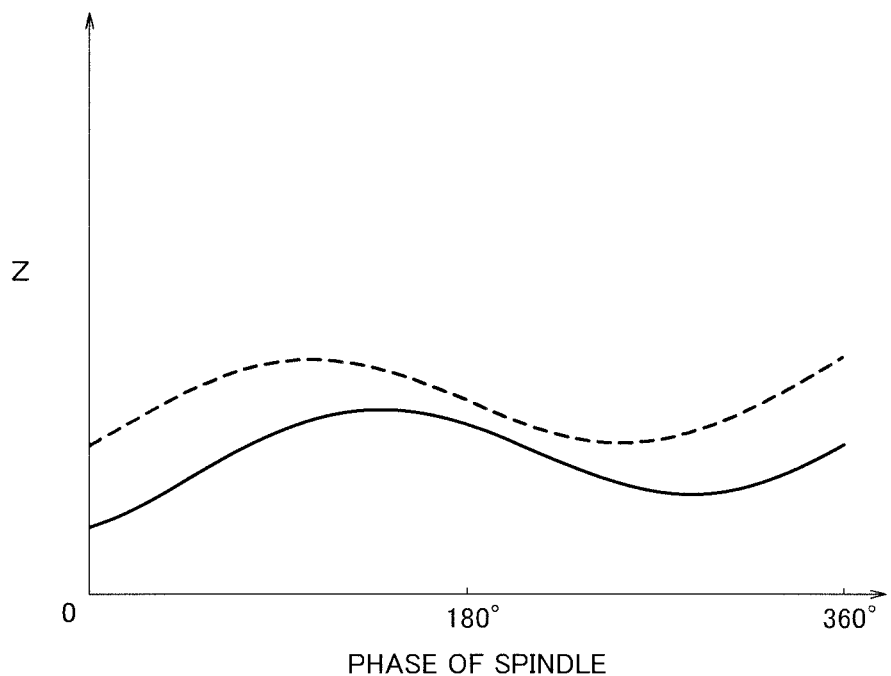
(B)
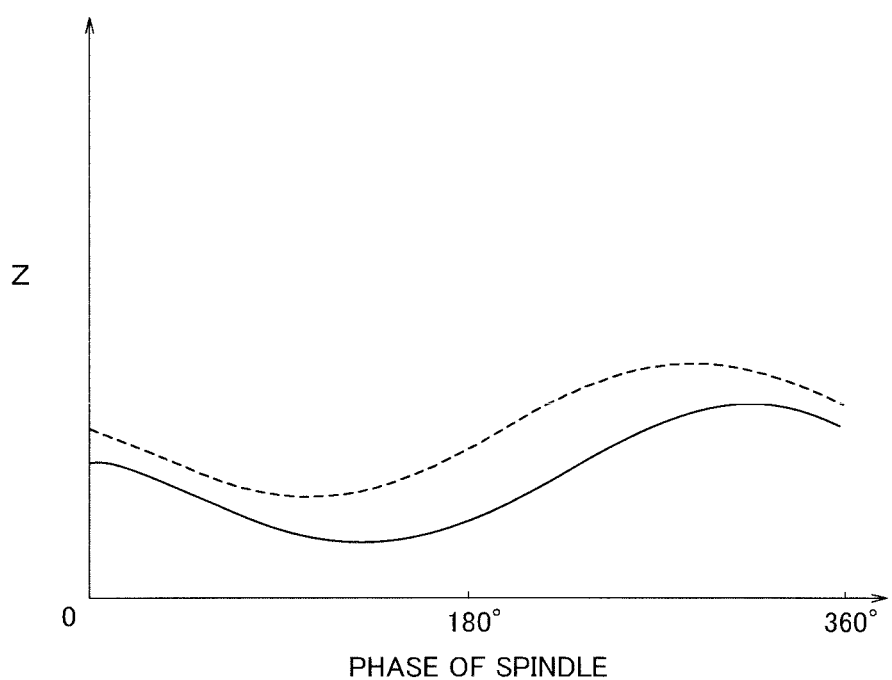

FIG.10
(A)
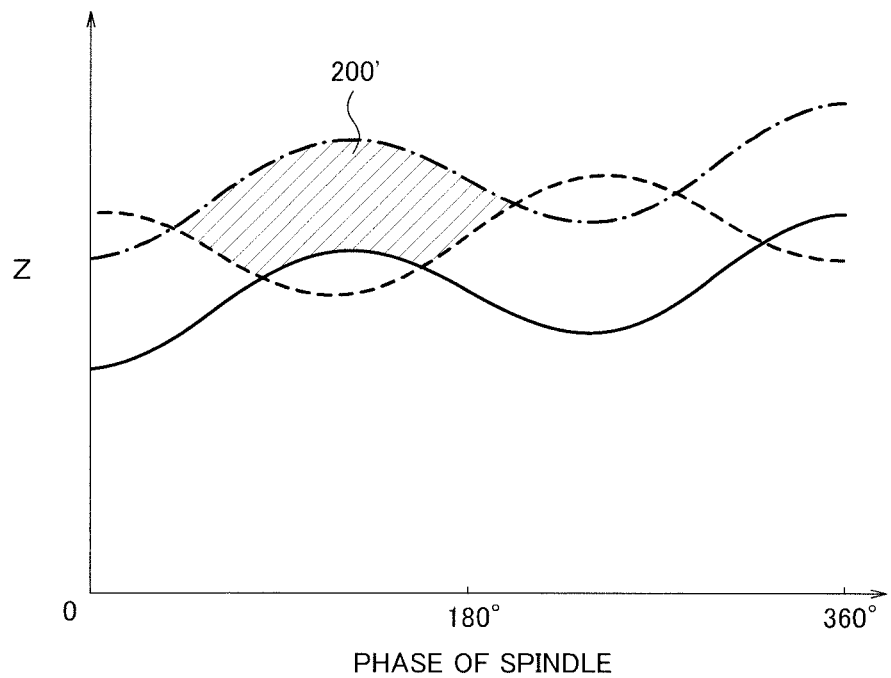
(B)
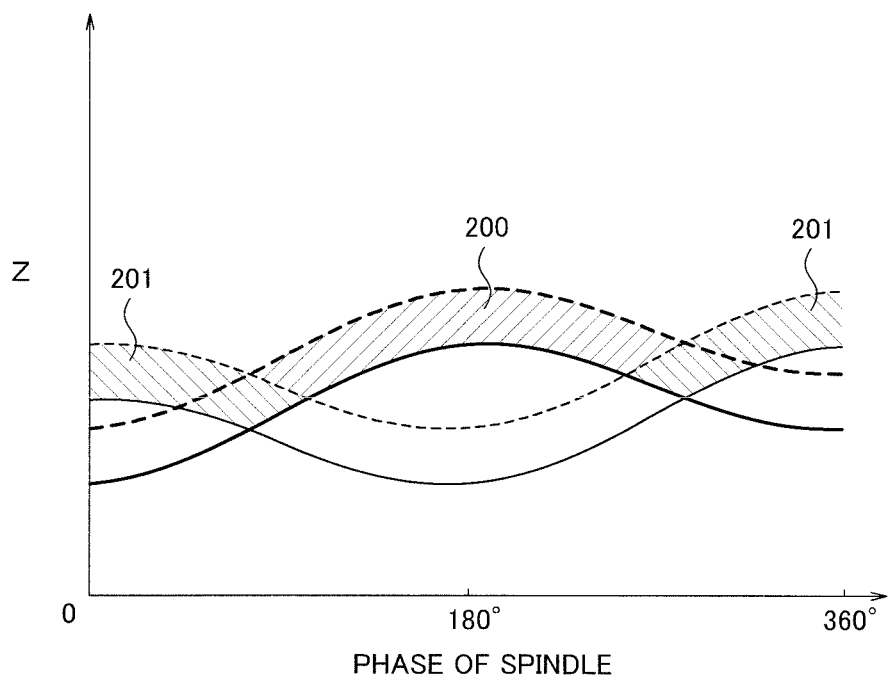

FIG.11
(A)
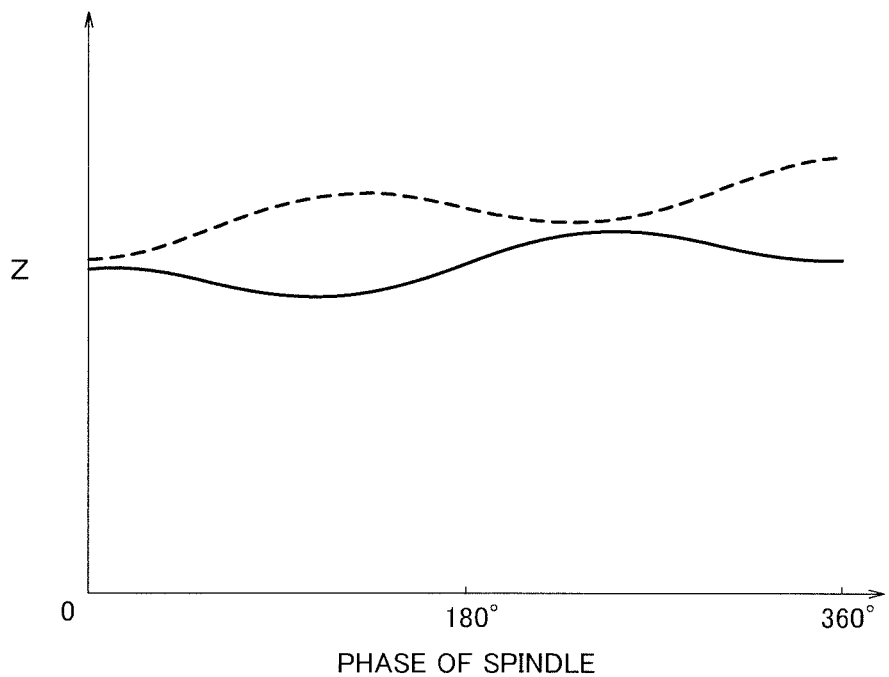
PHASE OF SPINDLE
(B)
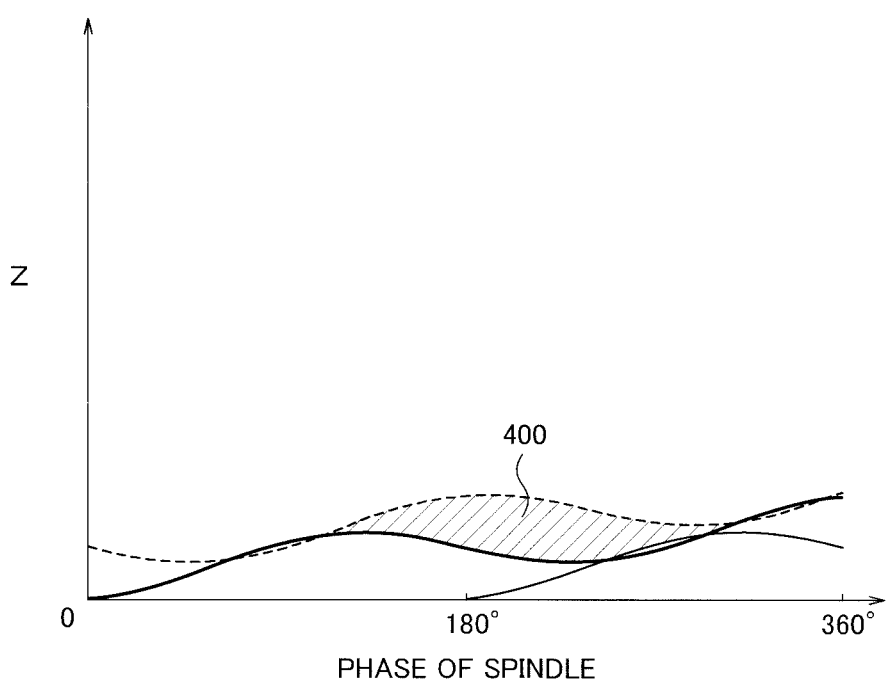
PHASE OF SPINDLE

FIG.12
(A)
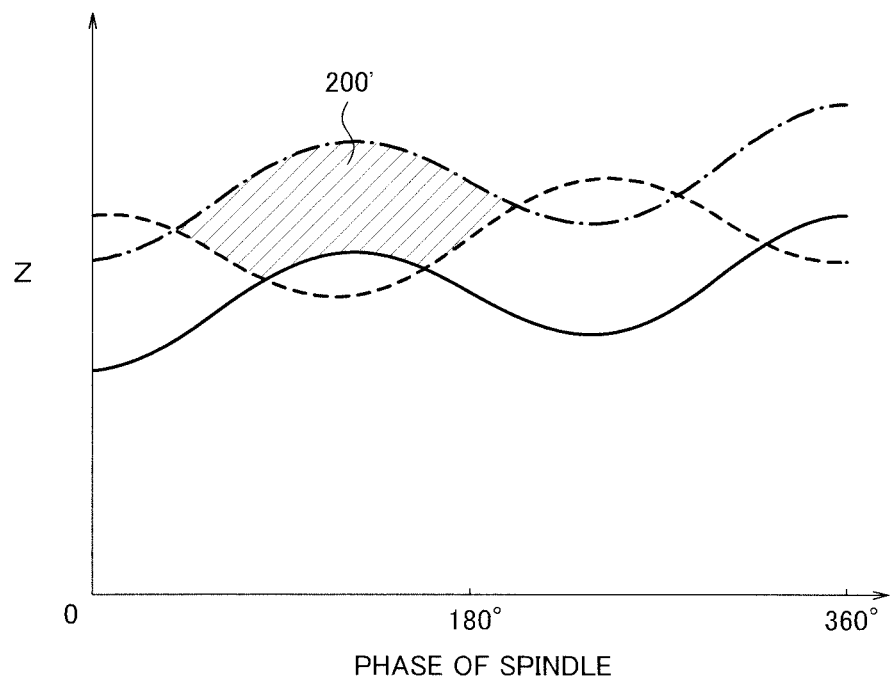
PHASE OF SPINDLE
(B)
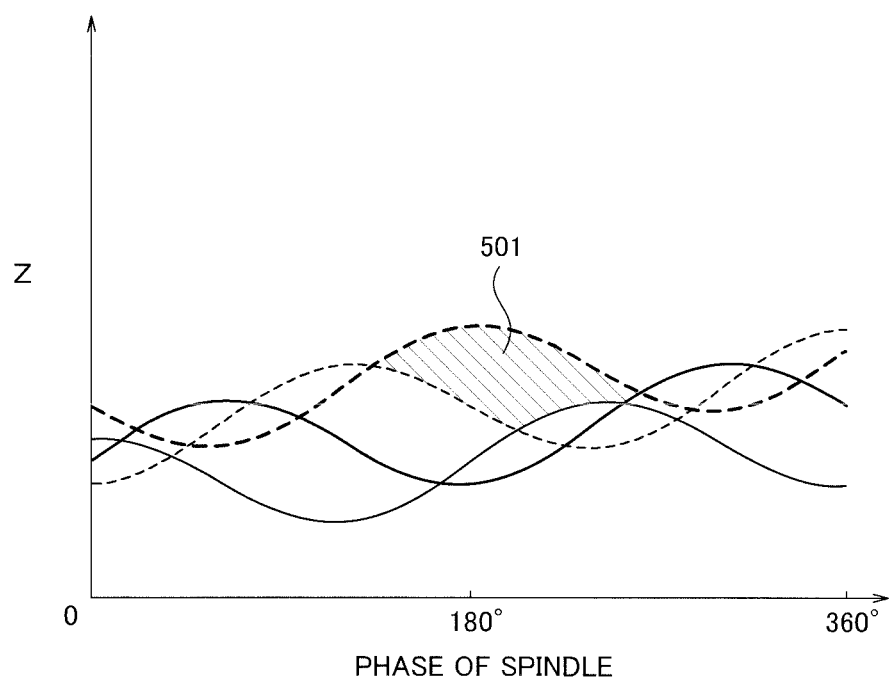
PHASE OF SPINDLE

CONTROL DEVICE FOR MACHINE TOOL AND MACHINE TOOL

TECHNICAL FIELD

The present invention relates to a control device for a machine tool and relates to a machine tool.

BACKGROUND ART

When turning a workpiece with a tool, so-called flow type continuous chips are produced and discharged around. If these continuous chips wind around the workpiece or the tool, the workpiece or the tool will be damaged. Thus, for example, Patent Literature 1 discloses a vibration cutting technique which can reciprocate a workpiece with respect to a tool to discharge chips in the form of segmented chips.

CITATION LIST

Patent Literature

[Patent Literature 1] Japanese Patent No. 3451800

SUMMARY OF INVENTION

Technical Problem

However, in the Patent Literature 1 described above, two tools (tips) are installed on one tool post (bite holder). Thus, for example, the number of times the tools reciprocates during one rotation of the workpiece (also referred to as the number of vibrations per rotation), which is set in order to segment chips, is set to only one same value even if two tools are installed. Then, the number of vibrations per rotation cannot be easily set.

The object of the present invention, which has been made in view of the above-described circumstances, is to provide a control device for a machine tool and a machine tool in which the number of vibrations per rotation can be easily set.

Solution to Problem

Firstly, the characteristic of the present invention is a control device for a machine tool for controlling a relative rotation between a workpiece and a cutting tool and a relative reciprocal movement between the workpiece and the cutting tool in a feed direction to perform vibration cutting to the workpiece, wherein the control device comprises a control section for controlling a spindle headstock, a first tool post, and a second tool post, the workpiece being installed on the spindle headstock, the first tool post being provided to be reciprocally movable along the feed direction with respect to the spindle headstock and installed with a first cutting tool for cutting the workpiece, and the second tool post being provided to be reciprocally movable along the feed direction with respect to the spindle headstock independently of the first tool post and installed with a second cutting tool for cutting the workpiece.

Secondly, the characteristic of the present invention is a control device for a machine tool comprising a control section for independently controlling each of relative movements between a plurality of cutting tools and a workpiece, the control section being capable of controlling the relative movements to cut the workpiece with vibration by the cutting tools, wherein when cutting the workpiece with one of the cutting tools, the control section controls the relative movement of another cutting tool independently of the relative movement of the one of the cutting tools such that a route of a cutting edge of the another cutting tool intersects a route of a cutting edge of the one of the cutting tools to perform cutting of the workpiece.

Thirdly, the characteristic of the present invention is in that the control section controls, for each of the cutting tools, a number of vibrations per rotation of the workpiece, an amplitude of the vibrations, or a phase of the vibrations on the basis of installation positions of the each of the cutting tools.

Fourthly, the characteristic of the present invention is in that the each of the cutting tools is arranged at opposite positions from each other with respect to the workpiece.

Fifthly, the characteristic of the present invention is a machine tool comprising any one of the above-mentioned control devices for a machine tool.

Advantageous Effects of Invention

The present invention can provide the following effects.

(1) The first tool post and the second tool post are provided so as to be reciprocally movable along a feed direction of the workpiece independently of each other. Thus, the number of times the first cutting tool reciprocates during one rotation of the workpiece and the number of times the second cutting tool reciprocates during one rotation of the workpiece can be set to different values. Then, when performing vibration cutting with generating segmented chips, numbers of vibrations are not limited to one value. Also, even if the number of vibrations is set to a value around integer, in which chips cannot be segmented in vibration cutting with one cutting tool, chips can be segmented. Even if the vibration frequency is limited by a minimum IT (reference period), the number of rotations of the spindle can be selected without caring about the range of the number of vibrations in which chips cannot be segmented. Thus, condition settings for performing vibration cutting become easy, and work can be started promptly.

Additionally, because the two cutting tools also share the load generated in cutting, the tool life is improved, and the machining accuracy of the workpiece can also be improved because the fluctuation amounts of the tool and the workpiece, which result from force or reaction force in machining, are reduced in comparison with a case where one cutting tool is provided.

(2) One of a plurality of cutting tools and the workpiece are provided to be reciprocally movable independently of each other. Thus, when performing vibration cutting, the numbers of vibrations are not limited to one value. In addition, the number of rotations of the spindle can be selected without caring about the range of the number of vibrations in which chips cannot be segmented. Thus, condition settings for performing vibration cutting become easy, and work can be started promptly.

Additionally, because the two cutting tools also share the load generated in cutting, the tool life is improved, and the machining accuracy of the workpiece can also be improved because the fluctuation amounts of the tool and the workpiece, which result from force or reaction force in machining, are reduced in comparison with a case where one cutting tool is provided.

(3) The control section controls, for each of the cutting tools, a number of vibrations per rotation of the workpiece, an amplitude of the vibrations, or a phase of the vibrations. Thus, condition settings for performing vibration cutting become easy.

(4) In a case where the each of the cutting tools is arranged at opposite positions, even if the workpiece is pushed out by the machining force from one tool, the workpiece is pushed out by the machining force in the opposite direction by the other cutting tool. This makes it possible to reduce the fluctuation of the workpiece.

(5) It is possible to provide a machine tool for which condition settings for performing vibration cutting becomes easy.

BRIEF DESCRIPTION OF DRAWINGS

FIG. 2 is a schematic diagram illustrating the relation between cutting tools and a workpiece according to an example of the present invention.

FIG. 6(A) is a diagram illustrating a route of a cutting edge of a first cutting tool, and FIG. 6(B) is a diagram illustrating a route of a cutting edge of a second cutting tool.

FIG. 7(A) is a diagram illustrating routes of cutting edges of a first and a second cutting tools, and FIG. 7(B) is a diagram illustrating routes of cutting edges of the first and the second cutting tools of FIG. 7(A) at 180 degrees opposite positions.

FIG. 8(A) is a diagram illustrating a route of a cutting edge of a first cutting tool, and FIG. 8(B) is a diagram illustrating a route of a cutting edge of a second cutting tool.

FIG. 10(A) is a diagram illustrating a route of a cutting edge in a case where vibration cutting is performed with one cutting tool, and FIG. 10(B) is a diagram illustrating routes of cutting edges of a first and a second cutting tools according to the first example.

FIG. 11(A) is a diagram illustrating a route of a cutting edge in a case where vibration cutting is performed with one cutting tool, and FIG. 11(B) is a diagram illustrating routes of cutting edges of a first and a second cutting tools according to the first example.

FIG. 12(A) is a diagram illustrating a route of a cutting edge in a case where vibration cutting is performed with one cutting tool, and FIG. 12(B) is a diagram illustrating routes of cutting edges of a first and a second cutting tool according to the first example.

DESCRIPTION OF EMBODIMENTS

Figure 1:
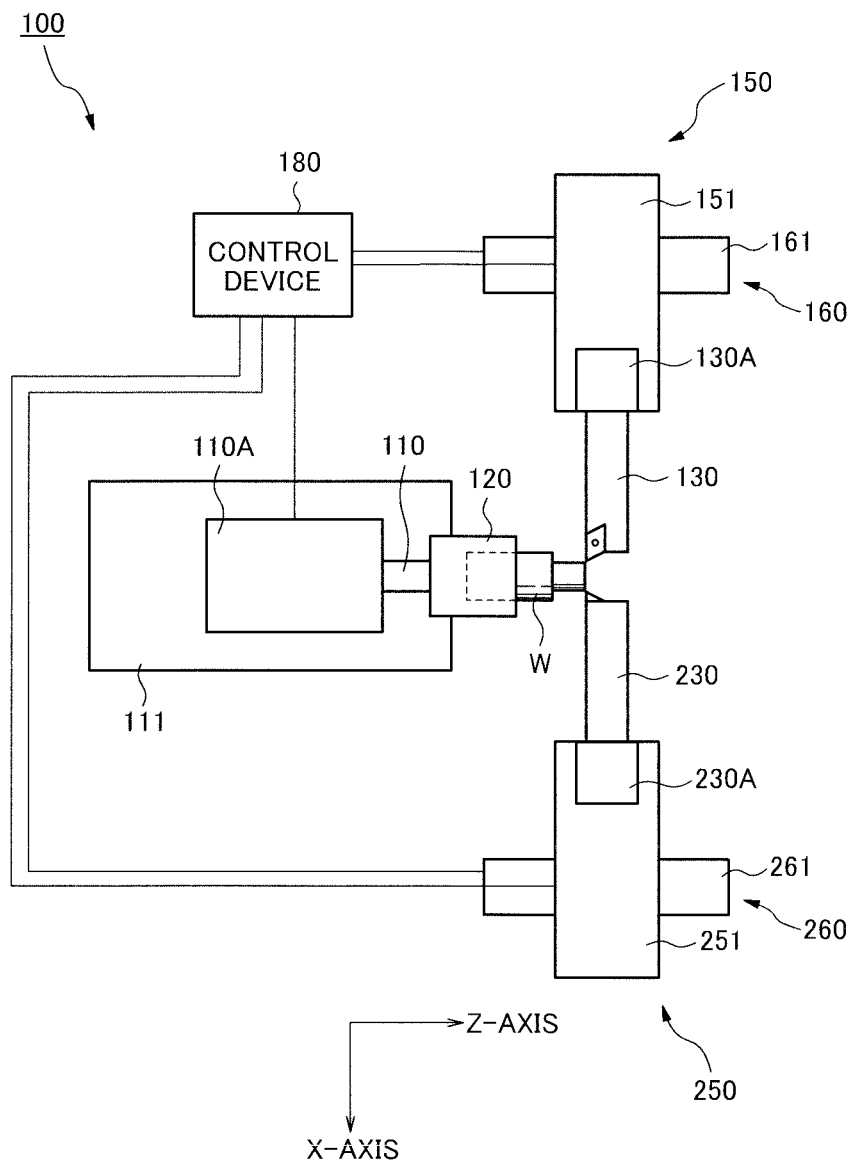
FIG. 1 is a diagram schematically illustrating a machine tool according to an example of the present invention.

Hereinafter, a control device for a machine tool and a machine tool according to the present invention will be described with reference to the drawings. As shown in FIG. 1, a machine tool 100 includes a spindle 110, cutting tools 130 and 230 such as tool bits for vibration cutting (hereinafter referred to as machining) to a workpiece W, and a control device 180.

A chuck 120 is provided at the end of the spindle 110, and the workpiece W is held by the spindle 110 via the chuck 120. The spindle 110 is rotatably supported by a spindle headstock 110A and rotationally driven by the power of a spindle motor (for example, a built-in motor) provided between the spindle headstock 110A and the spindle 110, for example.

The cutting tool 130 is installed on a first tool post 130A, and a tip 131 (see FIG. 2) is installed at the end of the cutting tool 130. The cutting tool 130 corresponds to a first cutting tool of the present invention.

A bed of the machine tool 100 is provided with a Z-axis direction feeding mechanism 160 and an X-axis direction feeding mechanism 150.

The Z-axis direction feeding mechanism 160 includes a base 161 integral with the bed, and a Z-axis direction guide rail slidably supporting the Z-axis direction feeding table. When the Z-axis direction feeding table (not shown) moves along the Z-axis direction shown in the figures (which coincides with the rotational axis direction of the workpiece W) by the drive of a linear servomotor (not shown), the first tool post 130A is moved in the Z-axis direction.

The X-axis direction feeding mechanism 150 is installed on the bed of the machine tool 100 via, for example, the Z-axis direction feeding mechanism 160, and includes an X-axis direction guide rail slidably supporting an X-axis direction feeding table. When the X-axis direction feeding table (not shown) moves along the X-axis direction, which is orthogonal to the Z-axis direction shown in the figures, by the drive of a linear servomotor (not shown), the first tool post 130A is moved in the X-axis direction.

Further, as shown in FIG. 1 and FIG. 2(B), the cutting tool 130 and the cutting tool 230 are arranged at 180 degrees opposite positions with respect to the workpiece. Particularly, the cutting tool 230 is installed on the second tool post 230A, and a tip 231 is installed at the end of the cutting tool 230, and the tip 231 and the tip 131 are arranged to be opposite from each other. The cutting tool 230 corresponds to a second cutting tool of the present invention.

The bed of the machine tool 100 is also provided with a Z-axis direction feeding mechanism 260 and an X-axis direction feeding mechanism 250.

The Z-axis direction feeding mechanism 260 is configured in the same manner as the Z-axis direction feeding mechanism 160, and includes a base 261 integral with the bed and a Z-axis direction guide rail slidably supporting a Z-axis direction feeding table. When the Z-axis direction feeding table (not shown) is moved along the Z-axis direction shown in the figures by the drive of a linear servomotor (not shown), the second tool post 230A is moved in the Z-axis direction.

The X-axis direction feeding mechanism 250 is configured in the same manner as the X-axis direction feeding mechanism 150, and is installed on the bed of the machine tool 100 via, for example, the Z-axis direction feeding mechanism 260, and includes an X-axis direction guide rail slidably supporting the X-axis direction feeding table. When the X-axis direction feeding table (not shown) moves along the X-axis direction shown in the figures by the drive of a linear servomotor (not shown), the second tool post 230A moves in the X-axis direction.

A Y-axis direction feeding mechanism may be provided on the machine tool 100. The Y-axis direction is a direction orthogonal to the Z-axis direction and the X-axis direction shown in the figures. The Y-axis direction feeding mechanism also has a Y-axis direction feeding table that can be driven by a linear servomotor. In a case where the Y-axis direction feeding mechanism is installed on the bed of the machine tool 100 via, for example, the Z-axis direction feeding mechanism 160 and the X-axis direction feeding mechanism 150, and where the first tool post 130A, for example, is installed on the Y-axis direction feeding table, the cutting tool 130 can be moved in the Y-axis direction in addition to the Z-axis and X-axis directions. The Z-axis direction feeding mechanism 160 and the X-axis direction feeding mechanism 150 may be installed on the bed of the machine tool 100 via the Y-axis direction feeding mechanism.

Although the above-described examples use the linear servomotor for the Z-axis direction feeding mechanism 160 and the like, a known ball screw and servomotor may be used.

The control device 180 controls rotations of the spindle 110 and movements of the Z-axis direction feeding mechanisms 160 and 260, the X-axis direction feeding mechanisms 150 and 250, and the Y-axis direction feeding mechanism (hereinafter they are referred to as the Z-axis direction feeding mechanism 160 and the like). The control device 180 drives the spindle motor to rotate the workpiece W with respect to the cutting tools 130 and 230 in the direction shown by the arrow in FIG. 2(A). And the control device 180 drives the Z-axis direction feeding mechanisms 160 and 260 respectively to reciprocate the cutting tools 130 and 230 in the Z-axis direction in FIG. 2(A) with respect to the workpiece W.

FIG. 2(A) illustrates an example in which the workpiece W rotates with respect to the cutting tools 130 and 230, and the cutting tools 130 and 230 reciprocate in the Z-axis direction with respect to the workpiece W.

Figure 3:
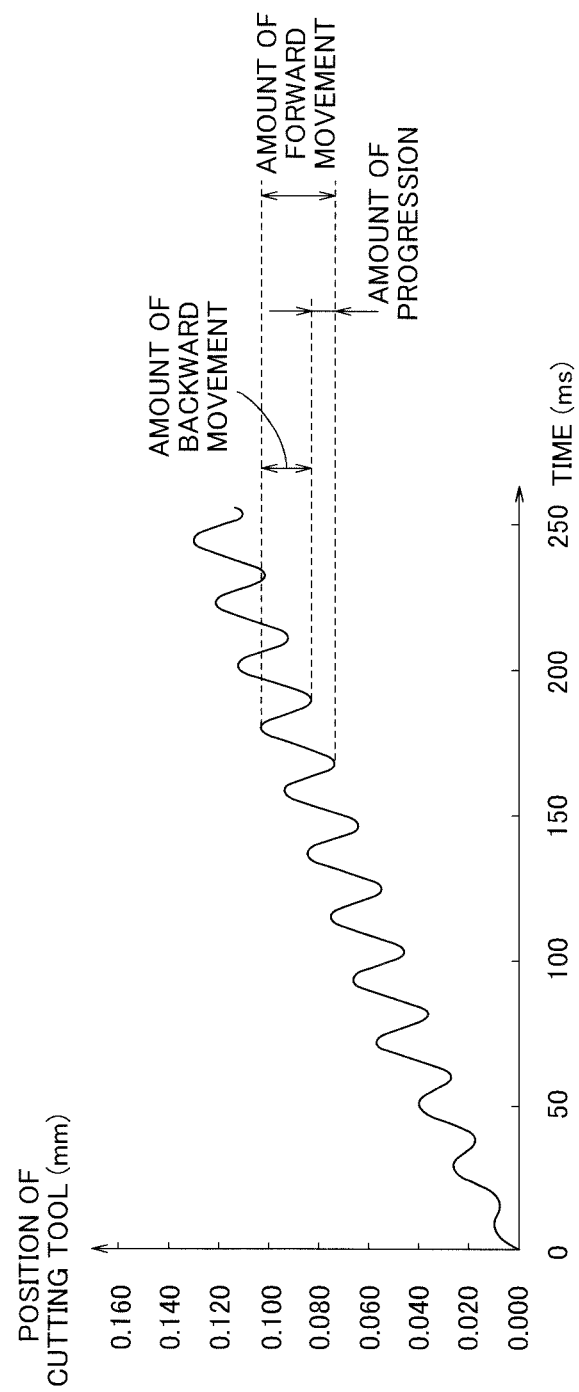
FIG. 3 is a diagram illustrating a reciprocal movement and a position of a cutting tool.

In a case where only one cutting tool 130 is used, the control device 180 moves the cutting tool 130 forward (this movement is referred to as forward movement) by a predetermined amount of the forward movement, and then moves the cutting tool 130 backward (which is referred to as backward movement) by a predetermined amount of the backward movement. Thus, as shown in FIG. 3, the cutting tool 130 can be fed with respect to the workpiece W by a difference (an amount of progression) between the amount of the forward movement and the amount of the backward movement.

Here, a method for realizing vibration cutting, which uses only the cutting tool 130 among the cutting tools 130 and 230, will be described. The workpiece W is rotated by the spindle motor in a predetermined direction. On the other hand, the cutting tool 130 repeats forward and backward movements in the Z-axis direction with respect to the spindle headstock 110A by the Z-axis direction feeding mechanism 160. The amount of feed is the total amount of progression while the workpiece W makes one rotation, or while a phase of the spindle changes from 0 to 360 degrees. Here, the phase of the spindle is 0 degree at a point where the cutting tool 130 starts machining, and the phase direction of the spindle is a direction in which the phase of the spindle progresses in the rotating direction of the workpiece W.

Figure 4:
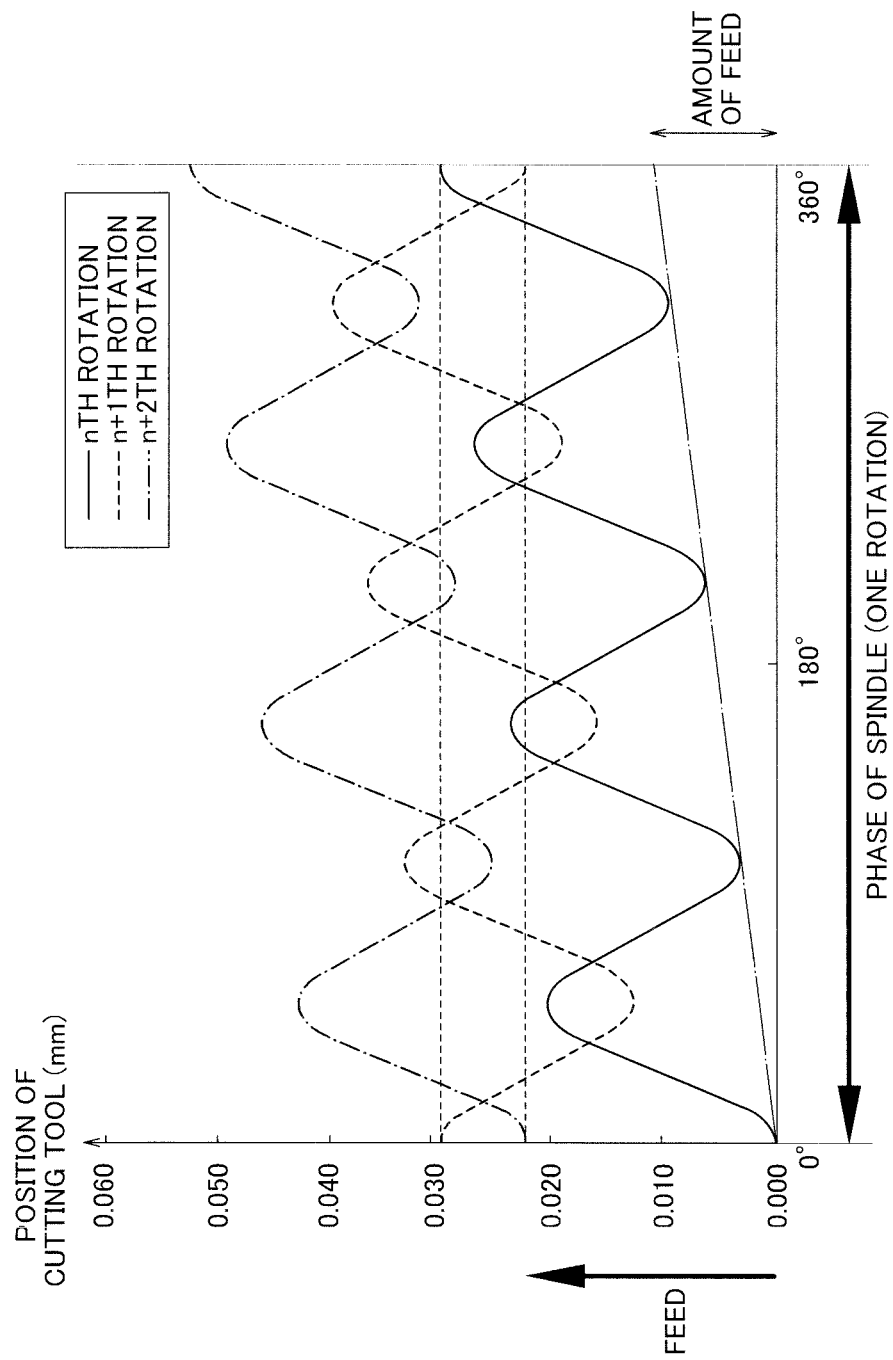
FIG. 4 is a diagram illustrating the relation between routes of a cutting edge in the nth rotation, the n+1th rotation, and the n+2th rotation of a spindle in a case where one cutting tool is used.

Thereby, the peripheral surface of the workpiece W is cut into a sinusoidally curved shape with the cutting tool 130. FIG. 4 shows an example in which the number of reciprocal movements of the cutting tool 130 during one rotation of the workpiece W (this number is also referred to as the number of vibrations D1 per rotation) is 3.5 (times/r).

The shape of the peripheral surface (shown by a solid line in FIG. 4) of the workpiece W, which is cut with the cutting tool 130 in the nth (n is an integer of 1 or more) rotation of the spindle 110, has inverted vibration phases from the shape of the peripheral surface of the workpiece W in the n+1th rotation of the spindle 110. And these peripheral surfaces are shifted in the phase direction of the spindle (the horizontal axis direction of the graph in FIG. 4). Because each of the sinusoidally curved waveforms is inverted from each other, in the same phase of the spindle, the positions of the lowest point in the valley in the peripheral surface shape of the workpiece W shown by the broken line in FIG. 4, which is the highest point in the mountain for the cutting tool 130, is opposite to the position of the highest point in the mountain in the peripheral surface shape of the workpiece W shown by the solid line in FIG. 4, which is the lowest point in the valley for the cutting tool 130.

As a result, in a route of a cutting edge of one cutting tool 130, a portion that is cut in the current forward and backward movements and a portion that will be cut in the subsequent backward and forward movements overlap. For example, the portion of the peripheral surface of the workpiece W that is cut in the n+1th rotation of the spindle 110 includes a portion of the peripheral surface of the workpiece that is cut in the nth rotation of the spindle 110. Thus, the cutting tool 130 performs an air-cut, in which the cutting tool 130 does not cut any portions of the workpiece W. In this air-cut, chips generated from the workpiece W are segmented and become segmented chips. In this way, in order to perform vibration cutting so that chips are segmented by one cutting tool, the number of vibrations D1 has to be set not to an integer, but to such as 3.5 (times/r), which is a value shifted by 0.5 from an integer, for example.

Incidentally, in the present example, the second tool post 230A can reciprocate in the Z-axis direction independently of the first tool post 130A with respect to the workpiece W. The control device 180 can also move (backwardly move) the cutting tool 230 by a predetermined amount of backward movement after moving it (forwardly moving) by a predetermined amount of forward movement.

Thus, the number of times the cutting tool 130 reciprocates during one rotation of the workpiece W (the number of vibrations D1 per rotation) and the number of times the cutting tool 230 reciprocates during one rotation of the workpiece W (the number of vibrations D2 per rotation) can be set to different values. Then, when machining the workpiece W, the numbers of vibrations are not limited to one value, and as described later, even if the numbers of vibrations are set to an integer or integers, chips can be segmented and condition settings for performing the machining become easy.

Furthermore, because the two cutting tools 130 and 230 also share the load generated in machining, the tool life is improved. In addition, because the amount of pushing back of the cutting tools 130 and 230, which receive the reaction force from the workpiece W, is also reduced, the machining accuracy of the workpiece W can also be improved.

Additionally, in a case where the cutting tools 130 and 230 are disposed at 180 degrees opposite positions, even if the workpiece W is pushed out by the machining force from one cutting tool, the workpiece W is pushed out by the machining force in the opposite direction by the other cutting tool. This makes it possible to reduce the fluctuation of the workpiece W.

Figure 5:
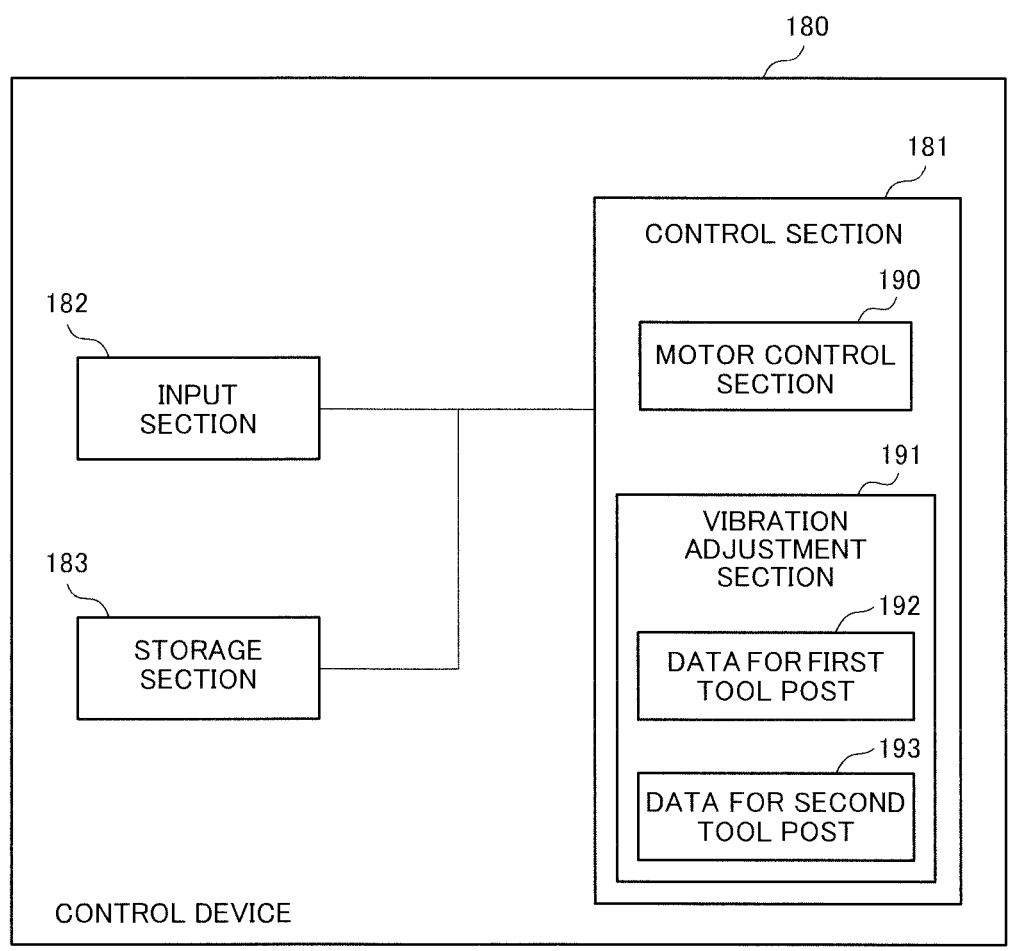
FIG. 5 is a diagram illustrating a configuration of a control device.

As shown in FIG. 5, the control device 180 includes a control section 181, an input section 182, and a storage section 183, which are connected via a bus.

The control section 181 consists of a CPU or the like and includes a motor control section 190 for controlling the operation of each motor and a vibration adjustment section 191 for setting the reciprocal movements of the Z-axis direction feeding mechanisms 160 and 260.

The control section 181 loads various programs and data stored in, for example, a ROM of the storage section 183 into a RAM and can execute the various programs to control the operation of the machine tool 100 via the motor control section 190 and the vibration adjustment section 191.

The reciprocal movements of the cutting tools 130 and 230 are performed at a vibration frequency f based on a predetermined instruction period T.

In a case where the control section 181 can output an operation instruction, for example, 250 times per second, the operation instruction can be output in a period of 1/250=4 (ms) (also referred to as a reference period IT). In general, the instruction period T is an integral multiple of the reference period IT.

For example, in a case where the instruction period T is (ms), which is four times as long as the reference period 4 (ms), the motor control section 190 outputs a drive signal to the Z axial direction feeding mechanisms 160 and 260 so that the cutting tools 130 and 230 reciprocate every 16 (ms). In this case, the cutting tools 130 and 230 can reciprocate at a vibration frequency f=1/T=1/(0.004×4)=62.5 (Hz). The vibration frequency for reciprocating the cutting tools 130 and 230 is selected from usable limited values (also referred to as instruction frequency fc).

In the control section 181, for example, a predetermined vibration waveform can be obtained on the basis of an input value in the input section 182 or a machining program.

For example, the vibration adjustment section 191 sets the number of vibrations D1 to 1 (times/r) from data for first tool post 192. The amplitude feed ratio Q, which is the ratio of the vibration amplitude to the feed amount, is set to 1.5. As shown in FIG. 6(A), a machining area of the cutting tool 130 in the nth rotation of the spindle 110 (workpiece W) (shown by a solid line in FIG. 6(A)) and a machining area of the cutting tool 130 in the n+1th rotation of the spindle 110 (workpiece W) (shown by a broken line in FIG. 6(A)) are obtained. In this case, the number of vibrations D1 is an integer, and the machining area in the nth rotation of the cutting tool 130 and the machining area in the n+1th rotation do not intersect. Thus, chips cannot be segmented solely by the cutting tool 130.

Further, for example, the vibration adjustment section 191 sets the number of vibrations D2 and the amplitude feed ratio Q to the same values as those of the cutting tool 130 from data for the second tool post 193. That is to say, the number of vibrations D2 is set to 1 (times/r), and the amplitude feed ratio Q is set to 1.5. The cutting tool 230 starts from a 180 degrees opposite position to the starting position of the cutting tool 130 and is driven with the number of vibrations D2. Thus, as shown in FIG. 6(B), a machining area in the nth rotation of the spindle 110 (shown by a solid line in FIG. 6(B)) and a machining area in the n+1th rotation (shown by a broken line in FIG. 6(B)) are obtained. Also in this case, the machining area in the nth rotation of the cutting tool 230 and the machining area in the n+1th rotation do not intersect. Thus, chips cannot be segmented solely by the cutting tool 230.

However, the cutting tool 130 and the cutting tool 230 alternately machine the workpiece W in a state where the vibration phases are inverted. Then, as shown in FIG. 7(A) that is the integration of FIGS. 6(A) and 6(B), routes of the cutting edges to the workpiece W are formed in the order of a narrow solid line by the cutting tool 230, a thick solid line by the cutting tool 130, a narrow broken line by the cutting tool 230, and a thick broken line by the cutting tool 130.

In this way, the route of the cutting edge of the cutting tool 130 (for example, a thick broken line) intersects the route of the cutting edge of the cutting tool 230 (for example, a narrow broken line), which performed the previous machining, to cause an air-cut. And the route of the cutting edge of the cutting tool 230 (For example, a narrow broken line) intersects the route of the cutting edge of the cutting tool 130 (for example, a thick solid line), which performed the previous machining, to cause an air-cut. Therefore, it can be seen that even if the numbers of vibrations D1 and D2 are an integer, chips can be segmented (as an example of a segmented chip, a machining amount 200 is shown in FIG. 7(A)).

In FIG. 7(A), in order to help understanding of the shape of a segmented chip, an example of routes of the cutting-edges of the cutting tools 130 and 230 during machining is illustrated. However, as described in FIG. 2, in a case where the cutting tool 230 starts machining from a 180 degrees opposite position from the cutting tool 130, as shown in FIG. 7(B), the machining area of the cutting tool 230 in the nth rotation of the spindle 110 is shown by a solid narrow line from 180 to 360 degrees of the phase of the spindle, and the machining area in the n+1th rotation is shown by a narrow broken line from 0 to 360 degrees of the phase of the spindle, and the machining area in the n+2th rotation is shown by a narrow dashed line from 0 to 180 degrees of the phase of the spindle. Thus, in this case, the machining amount 200 described in FIG. 7(A) is generated not at a position across 180 degrees of the phase of the spindle but at a position across 0 degree (360 degrees).

Next, for example, a case, in which the vibration adjustment unit 191 sets the numbers of vibrations D1 and D2 to 1.1 (times/r), which is very close to an integer, is assumed. And the amplitude feed ratio Q is set to 1.5. Similar to FIG. 6, an example of routes of the cutting-edges of the cutting tools 130 and 230 during machining is illustrated. As shown in FIG. 8(A), a machining area of the cutting tool 130 in the nth rotation of the spindle 110 (shown by a solid line in FIG. 8(A)) and a machining area of the cutting tool 130 in the n+1th rotation (shown by a broken line in FIG. 8(A)) are obtained. In this case, since the number of vibrations D1 is a value very close to an integer, the machining area of the cutting tool 130 in the nth rotation and the machining area in the n+1th rotation do not intersect. Thus, chips cannot be segmented by only the cutting tool 130.

As shown in FIG. 8(B), the machining area of the cutting tool 230 in the nth rotation of the spindle 110 (shown by a solid line in FIG. 8B) and the machining area of the cutting tool 230 in the n+1th rotation (shown by a broken line in FIG. 8(B)) are obtained. Also in this case, the machining area of the cutting tool 230 in the nth rotation and the machining area in the n+1th rotation do not intersect. Thus, chips cannot also be segmented solely by the cutting tool 230.

Figure 9:
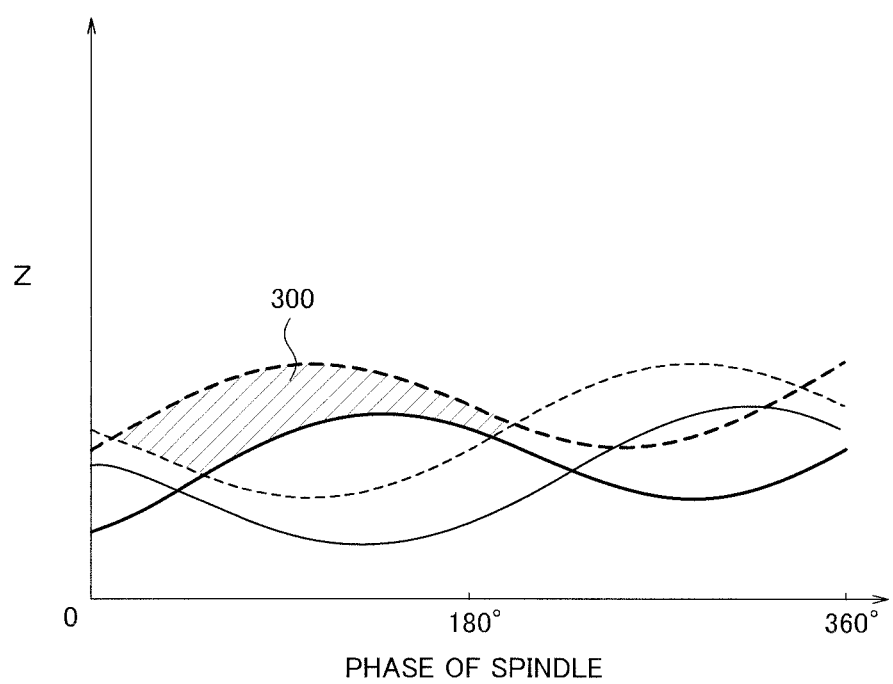
FIG. 9 is a diagram illustrating routes of cutting edges of a first and a second cutting tools.

However, as shown in FIG. 9 that is the integration of FIGS. 8(A) and 8(B), the routes of the cutting edges of the cutting tool 130 and the cutting tool 230 to the workpiece W are formed in the order of a narrow solid line by the cutting tool 230, a thick solid line by the cutting tool 130, a narrow broken line by the cutting tool 230, and a thick broken line by the cutting tool 130 and intersect each other.

Thus, also in this case, the route of the cutting edge of the cutting tool 130 (for example, a thick broken line) intersects the route of the cutting edge of the cutting tool 230 (for example, a narrow broken line), which performed the previous machining, to cause an air-cut. And the route of the cutting edge of the cutting tool 230 (for example, a narrow broken line) intersects the route of the cutting edge of the cutting tool 130 (for example, a thick solid line), which performed the previous machining, to cause an air-cut. Therefore, it can be seen that even in the case where the numbers of vibrations D1 and D2 are very close to an integer, chips can be segmented (a machining amount 300 is shown in FIG. 9).

FIG. 10(A) illustrates a route of a cutting edge in a case where machining is performed by one cutting tool, and the number of vibrations D is 1.5 (times/r) and the amplitude feed ratio Q is 1.5. In this case, the machining area in the nth rotation of the spindle 110 (shown by a solid line in FIG. 10(A)) intersects the machining area in the n+1th rotation of the spindle 110 (shown by a broken line in FIG. 10(A)). And the machining area in the n+1th rotation (shown by a broken line in FIG. 10(A)) intersects the machining area in the n+2th rotation (shown by a dashed line in FIG. 10(A)) to cause an air-cut. Thus, segmented chips (a machining amount 200' is shown in FIG. 10(A)) are generated.

On the other hand, FIG. 10(B) shows an example in which the numbers of vibrations D1 and D2 and the amplitude feed ratio Q are set to the same values as those in FIG. 7(A). Thus, the numbers of vibrations D1 and D2 are 1 (times/r), and the amplitude feed ratio Q is 1.5. Similar to FIG. 6, an example of the routes of the cutting edges of the cutting tools 130 and 230 during machining is illustrated. In addition to the generation of segmented chips shown by the machining amount 200 described in FIG. 7(A), the route of the cutting edge of the cutting tool 230 (for example, a narrow broken line) intersects the route of the cutting edge of the cutting tool 130 (for example, a thick solid line), which performed the previous machining, to cause an air-cut, and the route of the cutting edge of the cutting tool 130 (for example, a thick solid line) intersects the route of the cutting edge of the cutting tool 230 (for example, a narrow solid line), which performed the previous machining, to cause an air-cut. As a result, segmented chips indicated by the machining amount 201 are also generated.

Comparing the machining amounts 200 and 201 with the machining amount 200' in FIG. 10(A), it can be seen that the thicknesses of the machining amounts 200 and 201 are reduced to about a half of the machining amount 200'. Thus, since the load on each cutting tool can be reduced by reciprocating the two cutting tools, the tool life and the machining accuracy of the workpiece are also improved.

Further, according to the present invention, chips can be segmented even if the amplitude feed ratio Q is a small value.

Particularly, FIG. 11(A) illustrates a route of a cutting edge in a case where machining is performed by one cutting tool, and illustrates an example in which the number of vibrations D is 1.5 (times/r) and the amplitude feed ratio Q is 0.5. In this case, the machining area in the nth rotation of the spindle 110 (shown by a solid line in FIG. 11(A)) and the machining area in the n+1th rotation (shown by a broken line in FIG. 11(A)) do not intersect. Thus, chips cannot be segmented.

On the other hand, FIG. 11(B) shows an example in which the numbers of vibrations D1 and D2 and the amplitude feed ratio Q are set to the same values as those in FIG. 11(A). Thus, the numbers of vibrations D1 and D2 are 1.5 (times/r), and the amplitude feed ratio Q is 0.5. Similar to FIG. 7(B), an example of routes of the cuttings edge of the cutting tool 130 and cutting tool 230, which starts machining from a 180 degrees opposite position from the cutting tool 130, is shown. The route of the cutting edge of the cutting tool 230 (for example, a narrow broken line) intersects the route of the cutting edge of the cutting tool 130 (for example, a thick solid line), which performed the previous machining, to cause an air-cut. And the route of the cutting edge of the cutting tool 130 (for example, a thick solid line) intersects the route of the cutting edge of the cutting tool 230 (for example, a narrow solid line), which performed the previous machining, to cause an air-cut. Then, chips indicated by the machining amount 400 are generated. In this way, chips can be segmented even if the amplitude feed ratio Q is a small value, and the usable period of one cutting tool is extended. Furthermore, if the amplitude feed ratio Q can be reduced, the vibration of the machine tool itself can be reduced. This can contribute to the improvement of the life of the machine tool. Further, even if the feed amount is set to the same value, with the amplitude being small, the influence of vibration on the machine tool is reduced. Thus, the feed amount F in the Z-axis direction can be set to a large value.

In addition, according to the present invention, it is possible to shorten the length of segmented chips.

Particularly, FIG. 12(A) illustrates a route of the cutting edge in a case where machining is performed by one cutting tool and illustrates an example in which the number of vibrations D is 1.5 (times/r) and the amplitude feed ratio Q is 1.5, as in the example described in FIG. 10 A. In this case, the segmented chip indicated by the machining amount 200' has a shape with a fan-shaped surface that is long in the left and right direction as shown in the figure.

On the other hand, FIG. 12(B) shows an example in which the numbers of vibrations D1 and D2 and the amplitude feed ratio Q are set to the same values as those in FIG. 12(A). Thus, the numbers of vibrations D1 and D2 are 1.5 (times/r), and the amplitude feed ratio Q is 1.5. Similar to FIG. 6, an example of the routes of the cutting edges of the cutting tools 130 and 230 during machining is illustrated. The route of the cutting edge of the cutting tool 130 (for example, a thick broken line) intersects the route of the cutting edge of the cutting tool 230 (for example, a narrow broken line), which performed the previous machining, to cause an air-cut. And the route of the cutting edge of the cutting tool 230 (for example, a narrow broken line) intersects the route of the cutting edge of the cutting tool 130 (for example, a thick solid line), which performed the previous machining, to cause an air-cut. Furthermore, the route of the cutting edge of the cutting tool 130 (for example, a thick solid line) intersects the route of the cutting edge of the cutting tool 230 (for example, a narrow solid line), which performed the previous machining, to cause an air-cut. Thus, the segmented chips indicated by the machining amount 501 are generated.

Comparing the machining amount 501 with the machining amount 200' in FIG. 12(A), it can be seen that the length of the machining amounts 501 is reduced to about ⅔ of the length of the machining amount 200'. That is to say, since the length of the segmented chips can be shortened even if the numbers of vibrations are the same value, the number of rotations R of the spindle 110 (workpiece W) can be set to a large value.

Incidentally, although the numbers of vibrations D1 and D2 of the cutting tool 130 and 230 are set to the same value in the above examples, the present invention is not limited to these examples. In the present invention, the number of vibrations D1 of the cutting tool 130 and the number of vibrations D2 of the cutting tool 230 may be set to different values. For example, the number of vibrations D1 of the cutting tool 130 may be set to 1 (times/r) and the number of vibrations D2 of the cutting tool 230 may be set to 3 (times/r).

In the above examples, although the amplitude feed ratios Q, which are the ratios of the vibration amplitude to the feed amount of the cutting tools 130 and 230, are set to the same value, the amplitude feed ratios may be set to different values. For example, the amplitude feed ratio Q of the cutting tool 130 may be set to 1 and the amplitude feed ratio Q of the cutting tool 230 may be set to 1.5. For example, in a case where the routes of the cutting edges of the cutting tool 130 and the cutting tool 230 are set to a shallow amplitude and where the respective routes of cutting edges do not intersect, the amplitude feed ratio Q may be set to a value so that the route of the cutting edge of the cutting tool 230 has a deep amplitude. Then, the route of the cutting edge of the cutting tool 130 intersects the route of the cutting edge of the cutting tool 230, which performed the previous machining, to cause an air-cut, and the route of the cutting edge of the cutting tool 230 intersects the route of cutting edge of the cutting tool 130, which performed the previous machining, to cause an air-cut. Thus, even if the numbers of vibrations D1 and D2 and the phase of the vibration are the same or close values, machining can be performed with generating segmented chips.

Even if the numbers of vibrations D and the amplitude feed ratios Q of the cutting tools 130 and 230 are set to the same value, the phase of the vibration of the cutting tool 130 and cutting tool 230 may be set to be different. In the above examples, an example, in which the route of the cutting edge of the cutting tool 130 and the route of the cutting edge of the cutting tool 230 are inverted, is described with reference to FIG. 2. However, the difference of the phase of the vibration may be set such that the route of the cutting edge of the cutting tool 130 intersects the route of the cutting edge of the cutting tool 230, which performed the previous machining, to cause an air-cut and such that the route of the cutting edge of the cutting tool 230 intersects the route of the cutting edge of the cutting tool 130, which performed the previous machining, to cause an air-cut. Then, the difference of the phase of the vibration of each cutting tool (for example, the difference of ¼ cycle or ⅛ cycle) may be set according to installation positions of the cutting tool 130 and the cutting tool 230, and the time when the vibrations of the cutting tool 130 and the cutting tool 230 start may be controlled independently.

In addition, the phase of the vibration can be controlled by setting directions, in which the cutting tool 130 and the cutting tool 230 start vibrating, to different directions. For example, in a case where the cutting tool 130 and the cutting tool 230 are installed close to each other, the direction in which the cutting tool 130 start vibrating is set in the forward direction, and the direction in which the cutting tool 230 start vibrating is set in the backward direction. Then, the route of the cutting edge of the tool 130 and the route of the cutting edge of the cutting tool 230 can be substantially inverted, and the phases of the vibration can be different.

In the above examples, the cutting tools 130 and 230 are arranged at 180 degrees opposite positions from each other. However, the present invention is not limited to this example, and even when installed at positions other than 180 degrees, on the basis of the installation positions of the first tool post and the second tool post, the same effects as those described above can be obtained by adjusting with the vibration adjustment section at least one of the numbers of vibrations D, the amplitude feed ratios Q, and the phases of the vibration at each installation position of the first tool post and the second tool post.

Further, in the above description, the workpiece W rotates with respect to the cutting tools 130 and 230, and the cutting tools 130 and 230 reciprocate with respect to the workpiece W in the Z-axis direction. However, the present invention is naturally applied to a case where the workpiece W rotates with respect to the cutting tools 130 and 230 and the workpiece W and, for example, the cutting tool 130 reciprocate in the Z-axis direction with respect to the cutting tool 230.

In the above description, the workpiece W or the cutting tool is reciprocated such that the relative feed direction between the workpiece W and the cutting tool is the rotational axis direction (Z-axis direction) of the workpiece W. However, the same effect can be obtained even if the workpiece W or the cutting tool is reciprocated such that the feed direction is the radial direction of the workpiece W (X-axis direction).

REFERENCE SIGNS LIST 100 machine tool
110 spindle
110A spindle headstock
120 chuck
130 cutting tool
130A first tool post
131 tip
150 X-axis direction feeding mechanism
151 base
160 Z-axis direction feeding mechanism
161 base
180 control device
181 control section
182 input section
183 storage section
190 motor control section
191 vibration adjustment section
192 data for first tool post
193 data for second tool post
230 cutting tool
230A second tool post
231 tip
250 X-axis direction feeding mechanism
251 base
260 Z-axis direction feeding mechanism
261 base

The invention claimed is:

1. A machine tool comprising:
a control device;
a first cutting tool and a second cutting tool;
the control device configured to independently control relative movements between the first cutting tool and the second cutting tool with respect to a workpiece,
the control section configured to independently control each of relative movements between first cutting tool with respect to a workpiece and between the second cutting tool with respect to the workpiece, such that when cutting of the workpiece is performed by the first cutting tool, the control section controls relative movements of the second cutting tool independently of the relative movement of the first cutting tool,
wherein the control section is configured to set a phase of a vibration waveform of each of the first cutting tool and the second cutting tool such that routes of cutting edges of the first cutting tool and the second cutting tool intersect routes of the cutting edges in a previous machining of each other of the first cutting tool and the second cutting tool to perform cutting of the workpiece.

2. The machine tool according to claim 1, wherein a cutting amount of the each of the first and second cutting tools in a radial direction of the workpiece is set to a same value.

3. The machine tool according to claim 1, wherein the control section controls, for the each of the first and second cutting tools, a number of vibrations per rotation of the workpiece, an amplitude of the vibrations, or a phase of the vibrations on the basis of installation positions of the each of the first and second cutting tools.

4. The machine tool according to claim 1, wherein the each of the first and second cutting tools is arranged at opposite positions from each other with respect to the workpiece.

5. The machine tool according to claim 2, wherein the control section controls, for the each of the first and second cutting tools, at least one of a number of vibrations per rotation of the workpiece, an amplitude of the vibrations, and a phase of the vibrations on the basis of installation positions of the each of the cutting tools.

6. The machine tool according to claim 2, wherein the each of the first and second cutting tools is arranged at opposite positions from each other with respect to the workpiece.

7. The machine tool according to claim 3, wherein the each of the first and second cutting tools is arranged at opposite positions from each other with respect to the workpiece.

8. A control device of a machine tool including a first cutting tool and a second cutting tool, wherein:
   The control device is the control device according to claim 1.

9. A control device of a machine tool including a first cutting tool and a second cutting tool, wherein:
   The control device is the control device according to claim 2.

10. A control device of a machine tool including a first cutting tool and a second cutting tool, wherein:
    The control device is the control device according to claim 3.

11. A control device of a machine tool including a first cutting tool and a second cutting tool, wherein:
    The control device is the control device according to claim 4.

* * * * *